United States Patent [19]
Cicci

[11] 4,018,036
[45] Apr. 19, 1977

[54] METHOD FOR HARVESTING CROPS USING A TRACTOR-PULLED CROP HARVESTER

[75] Inventor: George B. Cicci, Broadview, Ill.
Guy O. Tufts, Phoenix, Ariz.

[73] Assignee: International Harvester Company, Chicago, Ill.

[22] Filed: May 20, 1976

[21] Appl. No.: 688,204

Related U.S. Application Data

[60] Continuation of Ser. No. 492,632, July 29, 1974, which is a division of Ser. No. 353,037, April 20, 1973, Pat. No. 3,868,811.

[52] U.S. Cl. .................................. 56/1; 56/DIG. 2; 56/218
[51] Int. Cl.² ......................................... A01D 43/10
[58] Field of Search ............. 56/1, DIG. 1, DIG. 2, 56/14.5, 16.4, 16.5, 218, 327 R

[56] References Cited

UNITED STATES PATENTS 33,943   12/1861   Hopkins .............................. 56/266
2,989,832   6/1961   Hyman ................................ 56/10.7
3,097,470   7/1963   van der Lely ........................ 56/366
3,183,981   5/1965   Schlabs .............................. 172/162
3,832,837   9/1974   Burkhart et al. ..................... 56/218

Primary Examiner—Russell R. Kinsey
Attorney, Agent, or Firm—Dennis K. Sullivan; Floyd B. Harman

[57] ABSTRACT

A method and apparatus is provided for harvesting crops in adjacent rows or swaths using a tractor-drawn crop harvester adapted for operation on either side of the pulling tractor. The crop harvester is provided with an arched hitching tongue extending from a location proximate to the transverse center of the harvester frame to the hitch of the tractor which is capable of swinging over the harvesting apparatus and of sufficient length to permit the harvester to be positioned by a control mechanism to operate on either side of the tractor.

3 Claims, 2 Drawing Figures

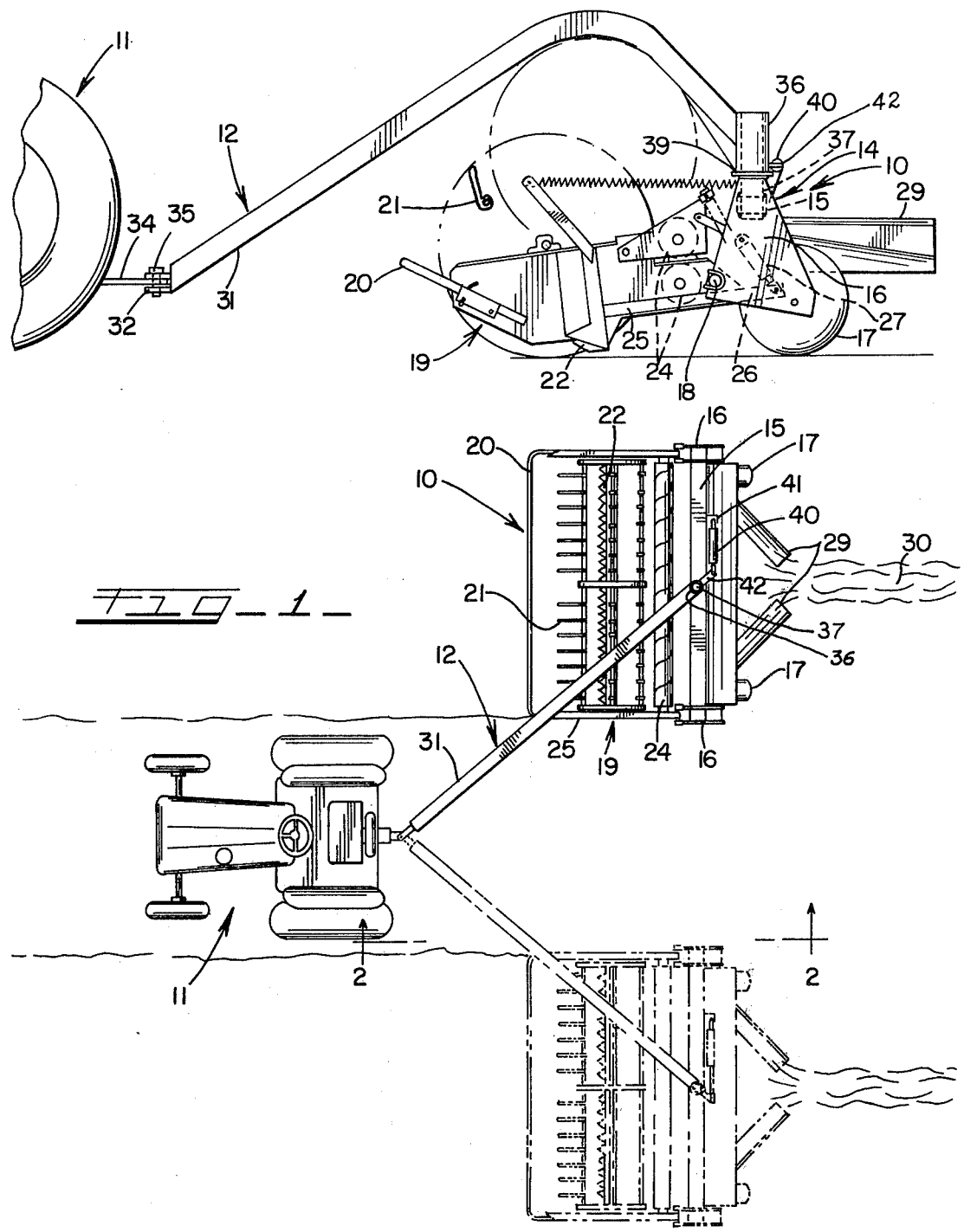

METHOD FOR HARVESTING CROPS USING A TRACTOR-PULLED CROP HARVESTER

This is a continuation of application Ser. No. 492,632, filed July 29, 1974, which is a division of application Ser. No. 353,037, filed Apr. 20, 1973, now U.S. Pat. No. 3,868,811.

BACKGROUND OF THE INVENTION

This invention relates to method of harvesting crops in adjacent rows or swaths using a tractor-drawn crop harvester having means for changing its operating position to harvest crops on either side of the tractor as it advances in the field and to apparatus to perform said method, that is, a tractor-drawn crop harvester having an arched hitching tongue connecting it to the tractor which is pivotally mounted to the harvester frame about a vertical axis located proximate to the transverse center thereof and capable of swinging over the harvesting apparatus, the tongue being controlled and of sufficient length to permit the harvester to be operated on either side of the tractor.

Conventional tractor-drawn crop harvesters, and more specifically mower-conditioners, are designed to operate with the harvesting apparatus outboard of the tractor wheels to one side, usually the right side, so that the tractor will not be driven over the crop being harvested and press it into the ground where the mower cannot properly cut it. The common method of harvesting with this type of equipment is to circle the field cutting an inward spiral towards the center. However, in areas of the country where the fields must be irrigated, parallel rows of dirt dams or borders are spaced at about forty to sixty foot intervals across the field to prevent the irrigation water from flowing from the higher portion of the field to the lower portions. These borders are commonly about a foot and a half high by about two feet wide and present a barrier to harvesting by circling the the field since the harvester will not easily cross over them although they can be straddled in the direction of travel by the pulling tractor. Thus, with a conventional tractor-drawn harvester having the harvesting apparatus outboard on one side, the operator must make a pass in one direction on one side of the field and then go to the other side of the field, which may be a considerable distance, to return, the alternative being to run over the crops on the return pass.

One approach to solve this problem has been the self-propelled harvester which harvests the crop forwardly of the ground wheels thereby permitting the haarvester to return harvesting the row or swath adjacent to that cut on the previous pass. However, this type of machine is relatively expensive since it requires a power unit, operator's platform and controls, a more complicated drive train, and three or four wheels. Moreover, it is a single purpose machine as opposed to a tractor-harvester combination wherein the tractor may be used for many purposes.

The crop harvester described herein, which provides many of the advantages of the self-propelled harvester without the additional expense, is capable of operating on either side of the tractor and consequently, the operator can harvest the crops in the row or swath adjacent to the previously cut row or swath by turning around and placing the harvester on the opposite side of the tractor, the dirt borders being straddled by the tractor as necessary. In this manner, the operator simply works his way across the field as he would with a self-propelled unit and the only time crops need be run down by the tractor would be during the first pass in the field should there be insufficient room outside the crop for the tractor, a small disadvantage.

Specifically, the harvester is provided with an arched hitching tongue to connect it to the tractor hitch. The tongue arches over the harvesting apparatus mounted forwardly on the frame of the harvester and is pivotally mounted to the frame about a vertical axis located at approximately the transverse center of the harvesting apparatus so that the harvester will be able to swing, preferably an equal distance, to either side of the tractor and position the harvesting apparatus outboard of the tractor wheels. The angular position of the tongue with respect to the harvester and, the position of the harvester with respect to the tractor, is controlled by means, preferably a hydraulic cylinder, which are preferably remotely actuable from the tractor to permit the operator to make finite adjustments during operation as well as to swing the harvester from one side of the tractor to the other at the end of a pass.

Applicants are aware of a crop harvester which is somewhat similar structurally to that described herein. This prior art harvester has a swingable arched tongue of the type described above which is controlled by a remotely actuated hydraulic cylinder connecting the tongue to the harvester frame. However, the tongue in this prior art machine is pivotally mounted about a vertical axis which is located at the left side of the harvester frame rather than proximate to the center as in applicants' invention and the length of the tongue is not sufficient to permit the harvester to operate on both sides of the tractor nor does the advertising literature promulgated for this machine which Applicants have seen describe any such two way operation. These structural differences would result in this machine having the same difficulties as the conventional harvesters described above especially in border fields and render it incapable of meeting any of the objects of applicants' invention as set forth hereinafter.

It is a general object of the invention described herein to provide a tractor-drawn harvester able to harvest adjacent rows or swaths of crops from opposite directions without driving the pulling tractor over or through the crops.

It is further an object of the invention to provide a relatively efficient and inexpensive method of harvesting crops in adjacent rows or swath using a tractor-drawn crop harvester.

A further object of the invention is to provide a tractor-drawn crop harvester capable of being operated outboard of either side of the pulling tractor.

A more specific object of the invention is to provide a tractor-drawn crop harvester having controlled hitching means capable of passing over the harvesting apparatus to position the harvester on either side of the tractor.

BRIEF DESCRIPTION OF THE DRAWINGS

These and other objects and advantages of the invention will become apparent upon reading the following detailed description and upon reference to the drawings, in which:

FIG. 1 is a plan view of a tractor-harvester combination incorporating applicants' invention showing the harvester positioned on the right side of the tractor, the left side position being illustrated in phantom; and FIG. 2 is a side view of the harvester of FIG. 1 and a portion of the tractor taken substantially along the line 2—2 of FIG. 1;

DESCRIPTION OF A PREFERRED EMBODIMENT

In the following description, the terms left and right are taken to be as viewed by an operator sitting in the operator's seat of the tractor facing forwardly.

Turning now to FIG. 1, there is shown a tractor-drawn crop harvester generally designated 10, such as a mower-conditioner, which may be attached to a tractor generally designated 11 to be pulled thereby by hitch means generally designated 12. In accordance with the art, the tractor 11 additionally provides power, mechanical, electrical or hydraulic as the case may be, for operation of the various powered components on the harvester or mower conditioner 10.

The mower conditioner 10 comprises a frame assembly generally designated 14 having a transverse beam 15 connected, as by welding, to left and right side plates 16. The frame assembly 14 is supported by a pair of ground wheels 17 rotatably mounted to each of the side plates 16 and suitably arranged for travel on the forward direction. Forwardly on each of the side plates 16, a transverse pivot pin 18 is attached which receives the forwardly mounted harvesting apparatus generally designated 19, the harvesting apparatus 19 comprising a push over bar 20, a reel assembly 21, a sickle-type cutterbar 22, and conditioning rolls 24, all mounted on a frame assembly 25 for sequential contact with the crop as the harvester advances in the field, as is well known in the art.

The left and right rearward portions of the frame assembly 25 are pivotally mounted on their respective pins, 18, a frame member 26 extending rearwardly therefrom on at least one side to receive a hydraulic cylinder 27 having its other end connected to the side plate 16 to control the relative position of the harvesting apparatus 19 with respect to the frame assembly 15. Remotely controlled means (not shown) on the tractor 11 actuates the hydraulic cylinder 27 to raise and lower the harvesting apparatus 19 as shown in FIG. 2. Pivotally attached about vertical axes at the rear of the frame assembly 15 are a pair of side shields 29 which receive harvested crop from the harvesting apparatus 19 and consolidate it into a windrow 30. It will be appreciated that the foregoing has been a general description of a mower-conditioner. For those interested in a detailed description of such a harvester, reference may be had to U.S. Pat. No. 3,672,132.

To provide the harvester with the capability of operating on either side of the pulling tractor 11, an arched hitching bar 31 connects the mower-conditioner to the tractor, the forward portion or distal end of the hitch bar 31 having a clevis 32 welded thereto which may be pivotally connected by a pin 35 to a complementary hitch 34 located at the rear of the tractor 11. The hitch bar 31 extends rearwardly and upwardly from the clevis 32 to a point providing sufficient clearance for the harvesting apparatus in the fully raised position and then angles downwardly culminating in a journal member 36 welded thereto. The journal member 36 rotatably receives the upper portion of a vertical spindle 37 fixedly mounted to the transverse beam 15 of the frame assembly 14, the lower portion of the spindle 37 preferably extending slightly through the beam 15 and welded thereto. To allow the mower conditioner to have a full range of operability on either side of the pulling tractor in accordance with the invention, the spindle 37 is located substantially on the longitudinal centerline of the harvesting apparatus 19 of proximate the transverse center of the transverse beam 15, it being appreciated that the addition of drive mechanisms on one side of the harvester may cause a shift in the location of the center of the transverse beam 15 relative to the center of the harvesting apparatus 19.

Intermediate its ends but above the frame assembly 14, the spindle 37 is provided with an annular plate 39 on a diameter equal to or larger than the journal member 36. The plate 39 may be welded to the spindle 37 or may be an integral part thereof and provides support in the axial direction for the journal member 36. The arched hitching bar 31 with its pivotal mounting to the harvester near the transverse center thereof thus provides the harvester with a full capability of operating outward of the pulling tractor on either side, the hitching bar 31 being of sufficient length to permit the harvester to be trailed with the harvesting apparatus outboard of the tractor.

The control means for determining the relative angular position of the hitching bar 31 with respect to the transverse beam 15 and thus the position of the harvester 10 with respect to the tractor 11, comprises a hydraulic cylinder 40 having one end pivotally mounted to a bracket 41 affixed as by welding to the rear of the transverse beam 15 and the other end pivotally connected to a lever 42 affixed to and projecting radially from the journal member 36 opposite the connection of the hitching bar 31 thereto, the range of travel of the hydraulic cylinder 40 being sufficiently large to allow the hitching bar to be placed (while tractor and harvester are moving) at the appropriate angles with respect to the frame to permit operation of the harvester of either side of the tractor, as is shown in FIG. 1. The hydraulic cylinder 40 is preferably connected by hydraulic lines (not shown) to the tractor 11 which provides hydraulic fluid through control valve means for remotely actuating the hydraulic cylinder, as is well known in the art.

It can be seen that the above described hitching means effectively precludes the use of a rigid power take-off shaft to provide power for operating the harvester. However, other drive means are available. For example, the harvester may be driven by either a hydrostatic or hydraulic drive system, the hydraulic pump being mounted on the pulling tractor and connected by flexible lines mounted on the hitching bar to a hydraulic motor mounted on the harvester which may be attached to the standard drive train thereof.

In operation, the operator sets the harvester on the side of the tractor on which the unharvested crops are standing by actuating the hydraulic cylinder 40 as the tractor and harvester advance thereby causing the harvester to position itself on the appropriate side. As the tractor pulls the harvester through the field, the position of the harvester with respect to the tractor may be adjusted to avoid obstructions.

As the end of the field, the operator turns the tractor and harvester around and, while moving, actuates the hydraulic cylinder to move the harvester to the opposite side of the tractor so that the harvester is again on the side of the tractor on which the unharvested crops are standing. The tractor and harvester then return harvesting the row of crops adjacent those previously harvested. Continuing in this manner, the tractor and harvester shuttle back and forth across the field, the position of the harvester with respect to the tractor being changed from one side to the other at each end. In the border-type fields described above, the crops are harvested in rows parallel to the dirt borders, the tractor either straddling whatever borders may be present therein or being on the opposite side of the border from the harvester.

It is noted that the harvester may also be located directly behind the tractor. This position is used for harvesting crops where there is insufficient room adjacent the crops to run the tractor, as may occur when opening up a field bound by fences or other obstructions. This position is also useful for transport of the harvester to and from the field since it presents the narrowest width of the tractor and harvester combination.

Thus it is apparent that there has been provided, in accordance with the invention a crop harvester and method of harvesting crops that fully satisfies the objects, aims and advantages set forth above. While the invention has been described in conjunction with a preferred embodiment on a specific type of harvester, it is evident that other tractor-drawn harvesters may utilize this invention and that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A method of harvesting adjacent rows of standing crops in a field using a wheeled crop harvester having forwardly mounted harvesting apparatus and rearwardly mounted windrowing apparatus and pulled by a tractor, said harvester being adapted to operate on either side of said tractor, comprising:
    positioning the harvester with the harvesting apparatus outboard of one side of said tractor, said standing crops being located on said one side;
    pulling said harvester with said tractor through a first row of said crops to one end of said field, said harvester operating to harvest and windrow said crops and said tractor being outboard of said standing crops;
    turning said tractor and said harvester in the opposite direction of travel at the end of said field;
    positioning said harvester on the opposite side of said tractor from said one side while said harvester and said tractor are moving; and
    pulling said harvester through a row of standing crops adjacent to said first row to an end of said field opposite said one end, said harvester operating to harvest and windrow said crops in said adjacent row and said tractor riding in said first row and being outboard of said adjacent row.

2. A method of harvesting adjacent rows of standing crops in a field using a wheeled crop harvester having harvesting apparatus and crop handling apparatus in the rearwardly sequential order and pulled by a tractor having wheels, said harvester being adapted to operate on either side of said tractor outboard of said wheels, comprising:
    positioning the harvester with the harvesting apparatus outboard of the wheels on one side of said tractor, said standing crops being located on said one side;
    pulling said harvester with said tractor through a first row of said crops to one end of said field, said harvesting apparatus operating to harvest said crops and said crop handling apparatus handling said crops in sequential order, said tractor being outboard of said standing crops;
    turning said tractor and said harvester in the opposite direction of travel at the end of said field;
    moving said harvester from said one side of the tractor to the cropward side while said harvester and said tractor are moving, said harvesting apparatus being maintained in a forwardly mounted orientation relative to the line of travel of said tractor;
    pulling said harvester through a row of standing crops adjacent to said first row to an end of said field opposite said one end, said harvesting apparatus operating to harvest said adjacent row and said crop handling apparatus handling said crops in sequential order, said tractor being outboard of said adjacent row in the previously harvested row;
    turning said tractor and said harvester in the opposite direction of travel at said last mentioned end; and
    repeating the above steps on the next adjacent row of crops.

3. A method of harvesting hay standing in a field using a mower-conditioner having forwardly mounted cutting means, conditioning rolls, the crop discharge means in rearwardly sequential order and pulled through a draw bar hitch by a tractor, said mower-conditioner being adapted to operate on either side of said tractor outboard of the wheels thereof, comprising:
    placing the mower-conditioner in forward orientation outboard of the wheels on one side of said tractor, said standing crops being located on said one side;
    pulling said mower-conditioner with said tractor through a first row of said crops to one end of said field, said mower-conditioner operating to harvest, condition, and discharge said hay, said tractor being outboard of said standing hay;
    turning said tractor and said mower-conditioner in the opposite direction of travel at the end of said field;
    positioning said mower-conditioner in forward orientation of the opposite side of said tractor from said one side; and
    pulling said mower-conditioner through a row of standing crops adjacent to said first row to an end of the field opposite said one end, said mower-conditioner operating to harvest, condition, and discharge said adjacent row of hay, said tractor being driven in said first row outboard of said adjacent row.

* * * * *